Figure 1:
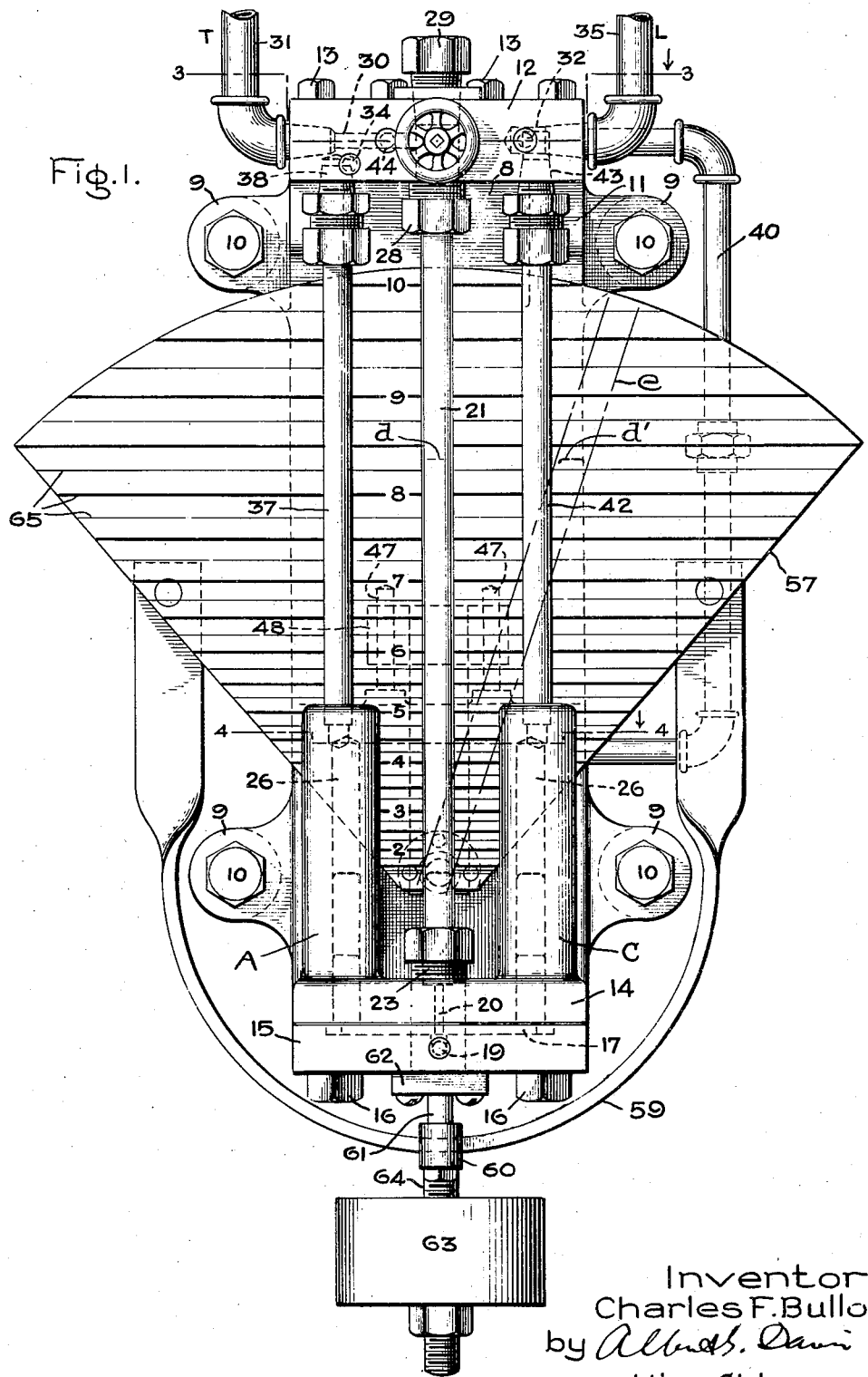

C. F. BULLOCK.
INDICATING INSTRUMENT.
APPLICATION FILED JAN. 7, 1918

1,304,259.

Patented May 20, 1919.
2 SHEETS—SHEET 1.

Inventor:
Charles F. Bullock,
by Albert G. Davis
His Attorney

C. F. BULLOCK.
INDICATING INSTRUMENT.
APPLICATION FILED JAN. 7, 1918.
1,304,259.
Patented May 20, 1919.
2 SHEETS—SHEET 2.
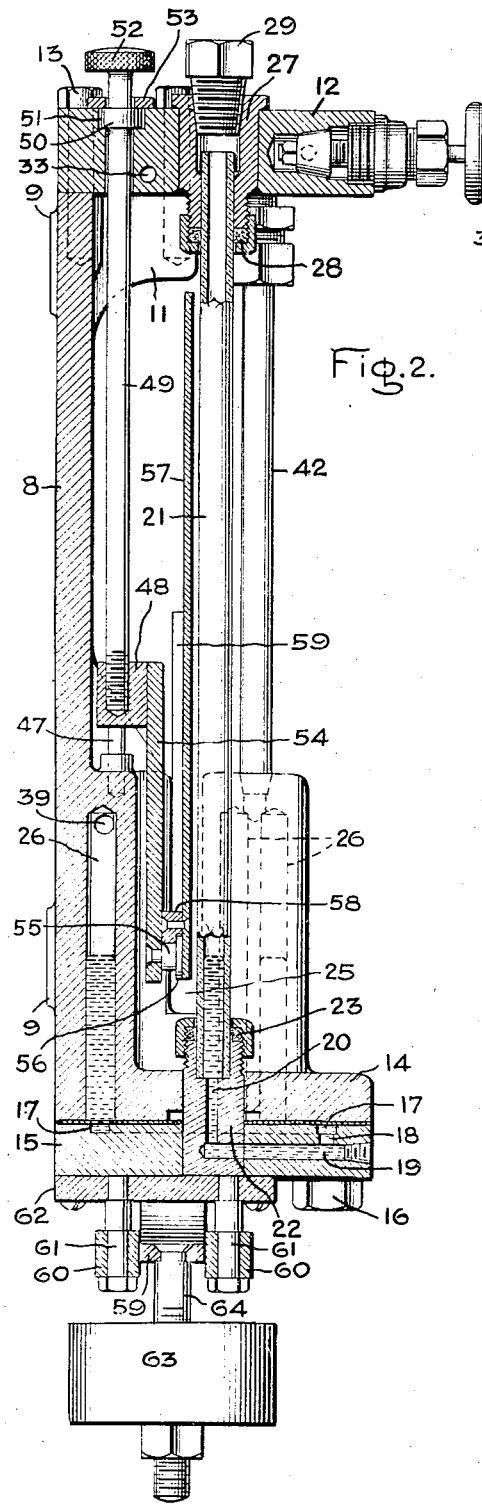
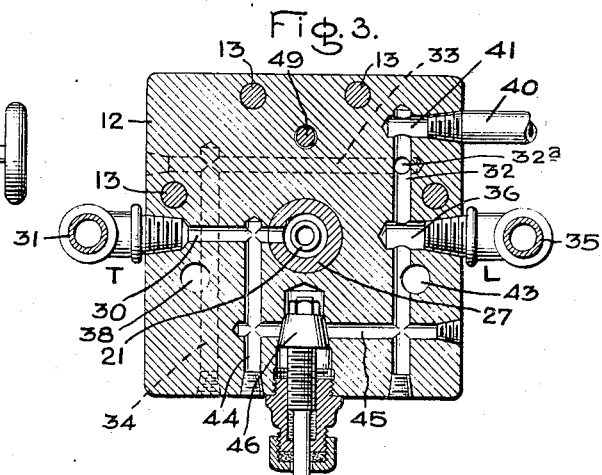
Fig. 3.
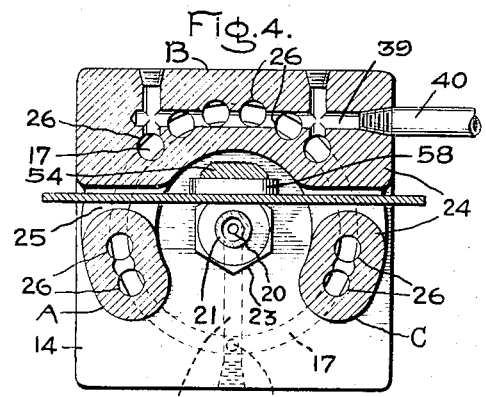
Fig. 4.
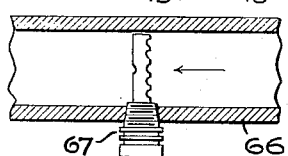
Fig. 5.
Inventor:
Charles F. Bullock,
by Albert H. David
His Attorney.

ent
UNITED STATES PATENT OFFICE.

CHARLES F. BULLOCK, OF SCHENECTADY, NEW YORK, ASSIGNOR TO GENERAL ELECTRIC COMPANY, A CORPORATION OF NEW YORK.

INDICATING INSTRUMENT.

1,304,259.

Specification of Letters Patent.

Patented May 20, 1919.

Application filed January 7, 1913. Serial No. 210,601.

*To all whom it may concern:*

Be it known that I, CHARLES F. BULLOCK, a citizen of the United States, residing at Schenectady, in the county of Schenectady, State of New York, have invented certain new and useful Improvements in Indicating Instruments, of which the following is a specification.

The present invention relates to indicating instruments and particularly to flow meters of the U-tube type such as are used for measuring the flow of fluids through conduits.

In the following specification the invention is described as applied to a flow meter, but it will be understood that it is not necessarily limited thereto as the principles involved may be utilized in connection with any instrument to which they may be found applicable.

The object of my invention is to provide an improved flow meter which can be utilized to indicate the flow under conditions in which the meter is not always maintained in a vertical position. Such a condition is met with, for example, on ship-board where due to the rolling of the ship the angular position of the meter is constantly changing, and my improved meter is especially intended for this use.

For a consideration of what I believe to be novel and my invention, attention is directed to the accompanying specification and the claims appended thereto.

In the drawing, Figure 1 is a face view of an indicating instrument of the U-tube type which embodies my invention; Fig. 2 is a vertical section thereof; Fig. 3 is a section taken on line 3—3, Fig. 1; Fig. 4 is a section taken on line 4—4, Fig. 1, and Fig. 5 is a diagrammatic view of a complete meter.

Referring to the drawing, 8 indicates a back plate provided with ears 9 to receive bolts 10 for fastening the instrument to a support. At the upper end of back plate 8 are brackets 11 to which is fixed a rectangular head 12 by suitable fastening means 13. At the lower end of back plate 8 is a rectangular base which is parallel to head 12 and comprises an upper plate 14 formed integral with back plate 8 and a lower plate 15 which is fastened to upper plate 14 by bolts 16. Between the two plates 14 and 15 is formed an annular groove 17 which communicates by way of opening 18 and passages 19 and 20 (Fig. 2) with a vertical tube 21 which rises from the center around which groove 17 is formed and which forms the trailing leg of the U-tube. The tube 21 is formed of glass or other suitable material and its lower end is carried in a thimble 22 in which are located the passage 20 and a part of passage 19. Between the thimble 22 and tube 21 is a suitable packing 23 to prevent leakage. On the plate 14 is a horseshoe shaped wall 24 which at its back merges into the back plate 8. The wall 24 has a slot 25 extending crosswise of it to accommodate certain parts referred to hereinafter. In the wall 24 are a plurality of vertical chambers 26 which terminate short of the top thereof and communicate at their lower ends with the annular groove 17. The chambers 26 taken collectively form the well or leading leg of the U-tube and it will be noted that they are all in communication with the trailing leg 21 through groove 17, opening 18 and passages 19 and 20. The purpose of forming the well or leading leg of the U-tube of a plurality of vertical chambers 26 is to provide an arrangement in which the indicating fluid will be prevented from being splashed or set into undue motion by the tilting of the instrument. In the present instance the chambers 26 are shown as being round, but it will be understood that they need not be necessarily of such shape as they may have any contour or shape found desirable, and there may be more or fewer of them as found desirable. Viewed from another aspect, for example, the well or trailing leg may be considered as being a curved vertically extending chamber with partition members therein to confine the indicating fluid. The upper end of tube 21 is fastened into a thimble 27 fixed in head 12, a suitable packing gland 28 being provided to prevent leakage. The outer end of thimble 27 is closed by a plug 29, which may be removed to permit the introduction of indicating fluid into the instrument. The interior of thimble 27 is in communication with a passage 30 in head 12, into the outer end of which screws the trailing pressure pipe 31. In the head 12 are communicating passages 32, 33 and 34 with which connects the leading pressure pipe 35 by way of passage 36 into which the end of pipe 35 is threaded. Passage 32 is connected to passage 33 by a vertical passage 32ª. The cross slot 25 divides the chambers 26 into three groups designated A, B and C, and the upper ends of them are connected to the passages 32, 33 and 34, and hence to the leading pressure pipe 35. The group A is connected to passage 34 by a pipe 37, the lower end of which is threaded into the top of wall 24 and the upper end into a passage 38 in head 12 which communicates with passage 34. The upper ends of the chambers 26 in group B are all connected together by a passage 39 which is connected by a pipe 40 to an opening 41 in head 12 which communicates with passage 32. The upper ends of the chambers 26 in group C are connected to a pipe 42 which at its lower end is threaded into an opening in the top of wall 24 and at its upper end is threaded into an opening 43 which connects with passage 32.

Connecting passage 30 to passage 32 is a short circuiting conduit comprising passages 44 and 45 in which is a suitable valve 46. When this valve is closed, as shown in Figs. 2 and 3, communication between passages 30 and 32 is shut off, but when open, communication is established between them and the leading and trailing pipes 35 and 31 are then in direct communication and the instrument is short circuited.

Projecting upward from the top of wall 24 is a pair of posts 47 which form guides for a vertically adjustable block 48, such block being provided with holes through which the guide posts project. Block 48 is carried on the lower end of a rod 49 which screws into a threaded opening therein. The upper end of rod 49 projects through head 12 and is provided with a flange 50 which rests in a recess 51 in head 12, and is provided with a knurled head 52. Flange 50 is retained in recess 51 by a ring 53. Since block 48 cannot turn, being held by posts 47, turning rod 49 will cause it to be raised or lowered, as is obvious. Depending from block 48 is an arm 54 on the end of which is a bearing 55 provided with a flange 56. Pivoted on bearing 55 is a scale plate 57. It is shown as being sectoral shape and is provided at its apex with an arcuate bearing member 58 which rests on bearing 55 and is provided with a recess in which flange 56 rests, thus locking the bearing parts together. Attached to scale plate 57 is an arc-shaped frame 59 which is guided by two rollers 60 carried between suitable shoulders on posts 61. The posts 61 depend from a plate 62 which is fixed to the bottom of plate 15. Carried by frame 59 is a weight 63 adjustably mounted on a threaded rod 64. This serves to always maintain the scale plate 57 in a vertical position so that the lines 65 forming the scale remain horizontal.

In Fig. 5 the instrument just described is shown as being connected to a pressure difference creating device, a nozzle plug of the Pitot tube type being illustrated. 66 is a conduit through which a fluid to be metered flows and 67 is a pressure difference creating device to which the leading and trailing pressure pipes 35 and 31 are connected. It will be understood that any suitable form of pressure difference creating device may be utilized.

In operation the back plate of the meter is fixed on a suitable support with the meter facing at right angles to the direction in which tilting may occur. In the case of a ship, for example, it may face either fore or aft. It is filled with indicating fluid, for example, mercury, to the zero line on the scale, as shown in Figs. 1 and 2. This zero line is located at the center of pivot 55. Now when the respective conduits 35 and 31 convey the leading and trailing pressures to the chambers 26 and tube 21, the indicating fluid will be depressed in all the chambers 26 and will rise in tube 21 in the well understood manner, indicating the flow on the scale. If the instrument tilts sidewise, the scale plate turns on pivot 55 due to weight 63 and is maintained vertical. The tilting, therefore, does not affect the reading of the instrument since a given pressure difference will maintain the indicating fluid at the same vertical distance above the zero line whether the column be vertical or inclined. This is illustrated in Fig. 1 where $d$ indicates a level in tube 21 when it is vertical and $d'$ indicates the same level with the tube 21 inclined as shown by the dot and dash lines at $e$. In each case the vertical deflection of the indicating fluid is the same.

The zero of the instrument can be tested at any time by opening the valve 46 thus short circuiting the instrument. The fluid in the two wells will then come to the same level. If this is not exactly at the zero line of the scale then indicating fluid can be added or removed as is necessary or the scale itself may be adjusted vertically by turning rod 49 to bring the zero on the scale to the level of the liquid in the U-tube.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. In an instrument of the character described, the combination of a frame, a U-tube fixed on the frame, a scale plate pivoted on the frame, and means for maintaining said scale plate in a vertical position.

2. In an instrument of the character described, the combination of a support, a tube having a column of indicating fluid therein and fixed to the support, a scale plate pivoted on the support, and means for maintaining said scale plate in a vertical position.

3. In an instrument of the character described, the combination of a support, a tube having a column of indicating fluid therein and fixed to the support, a scale plate pivoted on the support, and means for maintaining said scale plate in a vertical position, the zero point of said scale being located at the center of the pivot for the scale plate.

4. In an instrument of the character described, the combination of a support, a tube having a column of indicating fluid therein and fixed to the support, a scale plate pivoted on the support, means for maintaining said scale plate in a vertical position, and means for adjusting the scale plate and tube relative to each other.

5. In an indicating instrument, the combination of a U-tube comprising a vertical tube and an annular well concentric therewith, a support to which it is fixed, and a scale plate pivoted on the support and weighted so as to be maintained always in a vertical position, the zero point of said scale being located at the center of the pivot for the scale.

6. In an indicating instrument, a U-tube comprising a vertical tube, a curved wall surrounding the same and provided with a chamber which communicates at its lower end with the lower end of said tube, a support for the U-tube, a scale plate pivoted on said support, and means for maintaining said scale plate in a vertical position.

7. In an indicating instrument, a U-tube comprising a vertical tube and a curved wall surrounding the same and provided with a plurality of chambers all of which communicate at their lower ends with the lower end of said tube.

8. In a flow meter for shipboard use, a U-tube fixed to a stationary part of the ship, conduits connected to the two legs of the U-tube for conveying thereto the leading and trailing pressures of a pressure difference creating device, and a scale plate pivotally mounted in operative relation to the U-tube and weighted so as to be maintained always in a vertical position.

9. In a flow meter, a U-tube comprising a central tube which forms the trailing leg of the meter and means forming a plurality of chambers grouped around the central tube and forming the leading leg of the U-tube, trailing and leading conduits connected to the legs of the U-tube for conveying thereto the leading and trailing pressures of a pressure difference creating device, a scale plate pivoted adjacent the central tube, and means for maintaining said scale plate in a vertical position.

10. In a flow meter, the combination of a U-tube comprising a vertical tube and a curved wall surrounding the same and provided with a plurality of chambers all of which communicate at their lower ends with said U-tube, and trailing and leading conduits for conveying pressures thereto, one of said conduits communicating with said vertical tube and the other with the upper ends of all said chambers.

11. In a flow meter, the combination of a U-tube comprising a vertical tube and a curved wall surrounding the same and provided with a plurality of chambers all of which communicate at their lower ends with said U-tube, trailing and leading conduits for conveying pressures thereto, one of said conduits communicating with said vertical tube and the other with the upper ends of all said chambers, and a scale plate pivotally mounted in operative relation to the U-tube and weighted so as to be maintained always in a vertical position.

In witness whereof, I have hereunto set my hand this 4th day of January, 1918.

CHARLES F. BULLOCK.